United States Patent [19]
Kataumi et al.

[11] Patent Number: 5,797,295
[45] Date of Patent: Aug. 25, 1998

[54] SHIFT LOCK MECHANISM FOR SHIFT LEVER DEVICE

[75] Inventors: Yoshimasa Kataumi, Fukaya; Yasuyuki Ikegami, Kosai, both of Japan

[73] Assignee: Fuji Kiko Co., Ltd., Tokyo, Japan

[21] Appl. No.: 663,978

[22] Filed: Jun. 14, 1996

[30] Foreign Application Priority Data

Jun. 15, 1995 [JP] Japan ................... 7-148958

[51] Int. Cl.[6] .................................... F16H 59/10
[52] U.S. Cl. ................... 74/483 R; 74/477; 192/4 A
[58] Field of Search .................. 74/483 R, 477; 192/4 A

[56] References Cited

U.S. PATENT DOCUMENTS

| 5,036,962 | 8/1991 | Amagasa | 192/4 |
| 5,080,208 | 1/1992 | Sakuma et al. | 74/483 R |
| 5,379,871 | 1/1995 | Asano | 192/4 A |
| 5,379,872 | 1/1995 | Doerr et al. | 195/4 |
| 5,490,585 | 2/1996 | Togano | 192/4 A |
| 5,647,465 | 7/1997 | Burkhard et al. | 74/783 R |

FOREIGN PATENT DOCUMENTS 0 519 208  12/1992  European Pat. Off.

OTHER PUBLICATIONS

Patent Abstracts of Japan, vol. 014, No. 563, JP 02-240451, Sep. (1990).
Patent Abstracts of Japan, vol. 017, No. 534, JP 05-141510, Jun. (1993).
Patent Abstracts of Japan, vol. 018, No. 269, JP 06-042614, May (1994).

*Primary Examiner*—Charles A. Marmor
*Assistant Examiner*—David M. Fenstermacher
*Attorney, Agent, or Firm*—Foley & Lardner

[57] ABSTRACT

A shift lever device for an automatic transmission comprises a lock plate rotatably supported by a pair of supports and formed with a step that cooperates with a detent recess of a position plate to prevent vertical and longitudinal movements of a position pin at least in the neutral (N) range. The lock plate is rotated to engage with the detent recess when the position pin is moved to the N range.

11 Claims, 7 Drawing Sheets

SHIFT LOCK MECHANISM FOR SHIFT LEVER DEVICE

BACKGROUND OF THE INVENTION

The present invention relates to shift lever devices for use in automatic transmissions for motor vehicles.

The shift lever device for use in automatic transmissions is a device that ensures selection of a desired range through longitudinal movement of a shift lever to obtain changeover of the automatic transmission.

The automatic transmission often adopts a shift lock in view of the fact that, if the shift lever is operated without depressing a brake pedal, the motor vehicle can start suddenly when the engine speed is high.

There are two types of shift lock: parking lock that restrains a position pin of the shift lever in a parking (P) range, and neutral lock that ensures locking of the position pin when it is in the N range to prevent its movement to a reverse (R) or drive (D) range. These two types of shift lock are applied individually, or both together.

As for a shift lock mechanism, a lock member is pivotally supported to a position plate formed with a detent recess with which the position pin is engaged in a position thereof where the lock member can be engaged with the position pin, the lock member being rotated by movement of a plunger of a solenoid when the position pin is in the P or N range, for example.

With the shift lock, when the position pin is in the P or N range, the plunger of the solenoid is protruded by force of a spring arranged therein to engage the lock member with the position pin, restraining the position pin in the P or N range. Thus, even it a driver tries to operate the shift lever, the position pin is restrained and does not allow longitudinal movement of the shift lever.

Next, with release of the shift lock, when the brake pedal is depressed, a switch is turned on to operate the solenoid, which causes drawing of the plunger thereof so that the lock member is rotated out of the position where the lock member is engaged with the position pin. This enables movement of the shift lever to select a desired range, and sure prevention of sudden start of the motor vehicle due to the brake pedal being depressed.

In case of neutral lock, however, if the driver tries to move the shift lever from the N range to the D range without depressing the brake pedal, the lock member directly receives this operating force, resulting in possible breakage of the lock member and a support thereof due to a great load applied. That is, there arises a problem of strength of the lock member or shift lock mechanism, resulting in complicated construction and increased size and cost of the mechanism.

It is, therefore, an object of the present intention to provide a shift lock mechanism for a shift lever device for use in automatic transmissions that to simplified construction, reduced size, and low cost.

SUMMARY OF THE INVENTION

A shift lever device according to the invention for an automatic transmission includes a position plate formed with a detent recess, a position pin engagable with the detent recess, a pair of supports arranged below the detent recess, and a lock plate rotatably supported by the pair of supports. The lock plate is formed with a first step that cooperates with the detent recess to prevent vertical and longitudinal movements of the position pin at at least in a neutral range. The lock plate is rotatable to engage the detent recess when the position pin is moved to the neutral range.

The device further includes a lock cam rotatable to a position below the position pin when the position pin is moved to a parking range. The lock plate is rotatable together with the lock cam to engage the detent recess when the position pin is moved to the parking range.

The detent recess has a larger opening dimension than the lock plate to provide a clearance with respect to an inner periphery of the detent recess. The lock plate has a bottom that contacts an inner bottom of the detent recess when the position pin is depressed to contact the first step of the lock plate. The lock plate also has a side face and a second step that contact an inner side of the detent recess when the position pin is moved to contact the first step.

The device also includes means for resiliently or flexibly supporting the lock plate relative to the position plate to ensure a flexible movement of the lock plate relative to the position plate. According to one aspect of the invention, the resilient means comprises a flexible portion arranged between two divided portions of the lock plate. In another aspect of the invention, the resilient means are arranged between the lock plate and the pair of supports. The resilient means includes bearings of a shank integrated with the lock plate and a coil spring engaged with the shank. The resilient means can include holding arms integrated with the pair of supports.

DETAILED DESCRIPTION OF THE INVENTION

Figure 1:
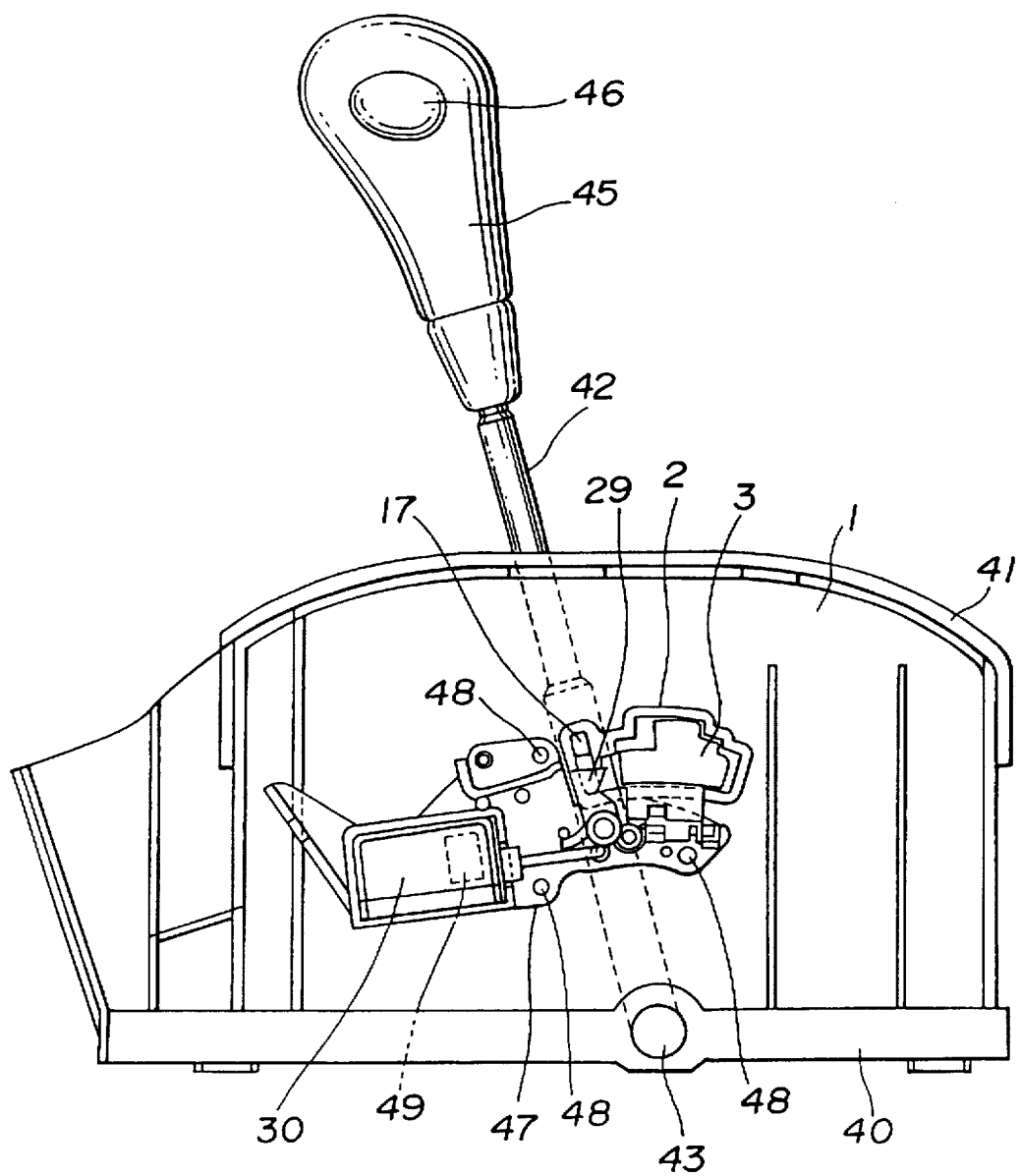
FIG. 1 is a sectional view showing a shift lever device to which the present invention is applied.

Referring first to FIG. 1, a shift lever device comprises a base 40 fixed to a vehicle body, a position plate 1 longitudinally erectly integrated with the base 40, and a casing 41 arranged on the position plate 1. A shift lever 42 has a lower end rotatably supported to the base 40 through a shaft 43, a portion protruding upwardly from a shift groove formed on an upper surface of the casing 41, and an upper end to which a knob 45 is mounted. A position pin 17 protrudes from a side face of the shift lever 42 to engage with a detent recess 2 formed in the position plate 1, the position pin 17 being vertically moved when pressing a push button 46 of the knob 45. The detent recess 2 has a peripheral edge shaped like a flange for increasing the strength of the peripheral edge.

A bracket 47 is mounted to the position plate 1 in the vicinity of the detent recess 2 through a screw 48, for example. Mounted thereto are a lock plate 3, a lock cam 29, an actuator 30, such as a solenoid, and a switch 49 for detecting a P-range or N-range position of the shift lever 42, which constitutes a unit that can be set only by mounting the bracket 47 to the position plate 1. The base 40, casing 41, bracket 47, lock plate 3, and lock cam 29 are resin moldings.

Figure 2:
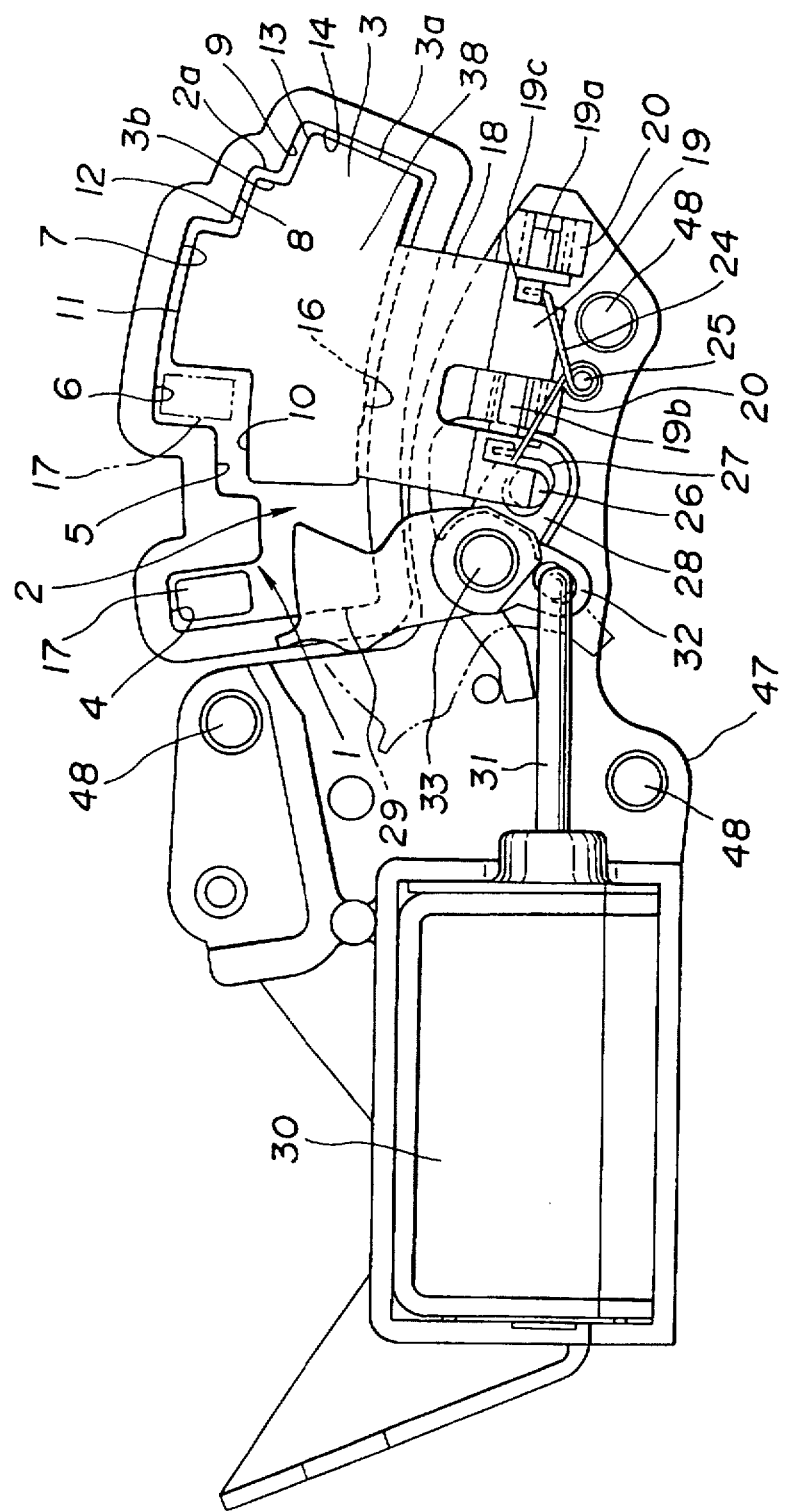
FIG. 2 is a fragmentary enlarged view of the shift lever device in FIG. 1.
Figure 3:
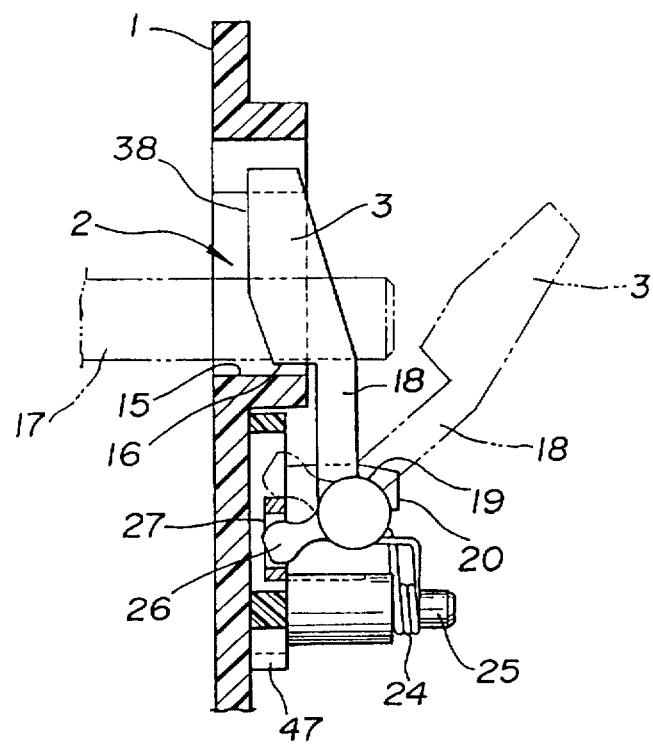
FIG. 3 is a side view, partly in section, of the shift lever device in FIG. 2.

Referring to FIGS. 2 and 3, a shift lock mechanism will be described. The lock plate 3 is pivotally arranged to the bracket 47 fixed to a side face of the position plate 1 in the vicinity of the detent recess 2, and below the detent recess 2 formed in the position plate 1, the lock plate 3 being rotatable in the direction perpendicular to the position plate 1, and engageable with the detent recess 2.

The lock plate 3 has an engaged portion 38 having a shape substantially similar to the detent recess 2, and an upper edge formed with a step 10 engaged with both reverse (R) and neutral (N) ranges 5, 6, a step 11 engaged with a drive (D) range 7, a step 12 engaged with a second (S) range 8, and a step 13 engaged with a low (L) range 9. The step 10 has a horizontal portion for preventing downward movement of the position pin 17, and a vertical portion for preventing horizontal movement of the position pin 17. The engaged portion 38 is shaped to fully be engageable with an inner periphery of the detent recess 2 with a predetermined clearance. Specifically, an outer periphery of the engaged portion 38 has one side in the R range 5 without extending in the P range 4, and the other side having a vertical portion 3a that can contact an L-range side inner side 14 of the detent recess 2. A lower end of the engaged portion 38 has a bottom 16 that can contact an inner bottom 15 of the detent recess 2.

Figure 10:
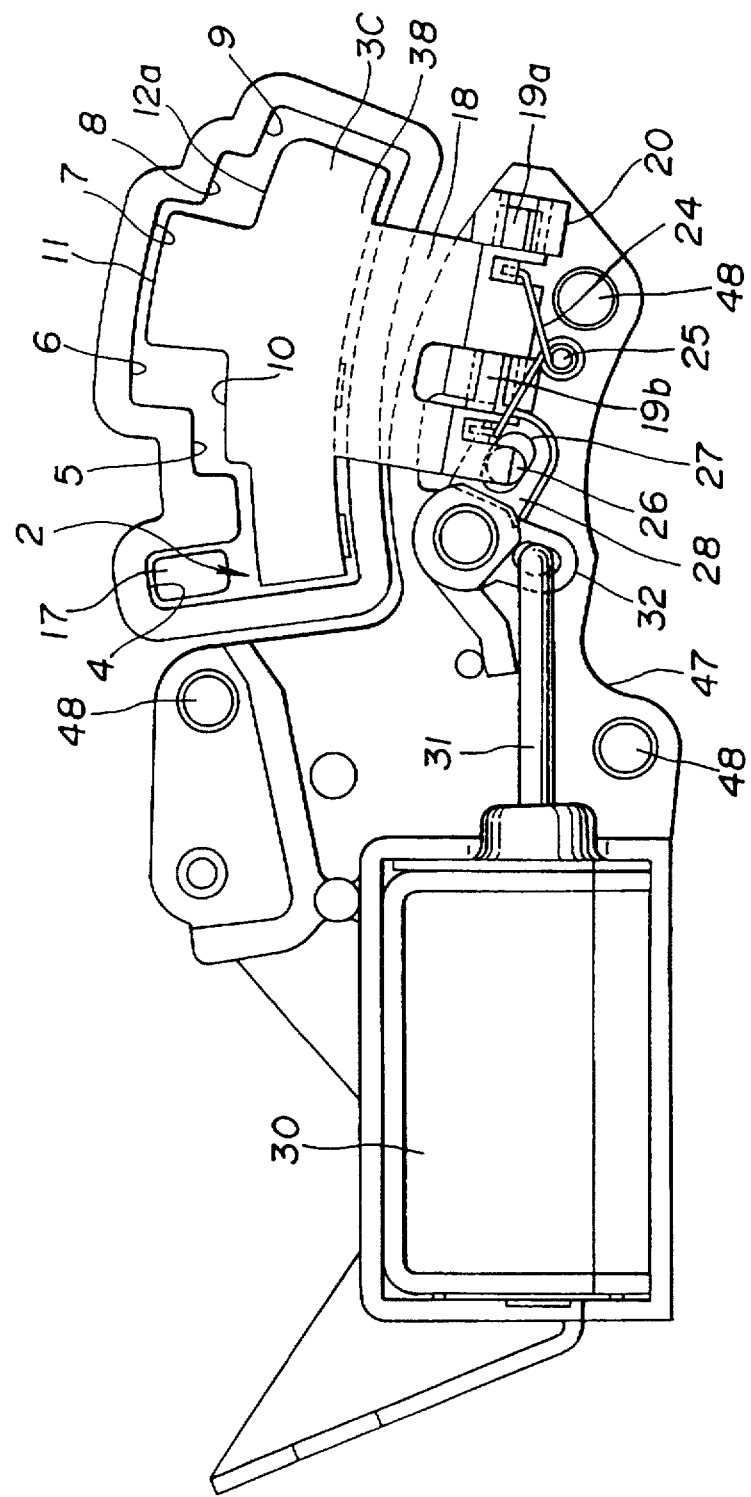
FIG. 10 is a view similar FIG. 8A, showing another embodiment of the present invention.

The lock plate 3 is out of a parking (P) range 4 since a park lock mechanism is arranged separately such that the lock cam 29 is rotated in and out of the P range 4. Therefore, referring to FIG. 10, in place of arranging the lock cam 29, which is positioned below the position pin 17, one side of the engaged portion 38 of a lock plate 3C may be extended to the P range 4 so that shift lock of the position pin 17 in the P and N ranges 4, 5 is ensured by the lock plate 3C. The lock plate 3C may be formed with a step 12a obtained by leveling the step 12 engaged with the S range 8 with the step 13 as shown in FIG. 10, having the engaged portion 38 that may not necessarily have a figure substantially similar to the detent recess 2.

Figure 4A:
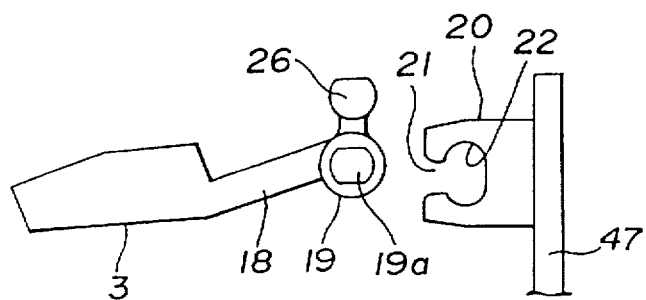
FIGS. 4A and 4B are side views showing an assembling example of a lock plate.
Figure 4B:
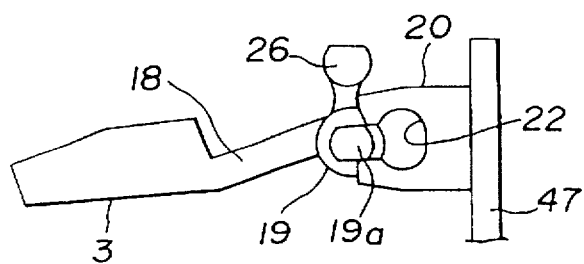

The lock plate 3 has at plate-like arm 18 integrated with a lower part of the engaged portion 38, and having a lower part integrated in turn with a shank 19. Referring also to FIGS. 4A and 4B, bearings 19a, 19b of the shank 19 have a substantially oval section, respectively, and are rotatably supported to supports 20, 20 arranged to the bracket 47 and separated from each other. Each support 20 has an opening 21 into which the bearing 19a, 19b of the shank 19 is inserted from its arched side as shown in FIG. 4B, and a hole 22 having a substantially oval section and communicating with the opening 21. The hole 22 is larger than the diameter of the bearing 19a, 19b of the shank 19 so that the bearing 19a, 19b is engaged therewith with a predetermined play to be able to move vertically.

Figure 5:
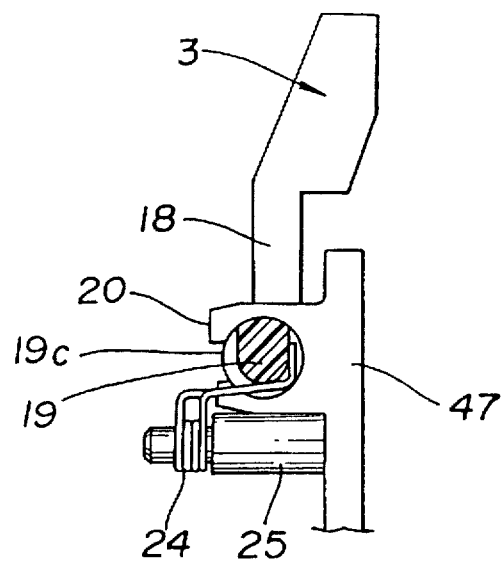
FIG. 5 is a view similar to FIG. 3, showing the lock plate as assembled.
Figure 11A:
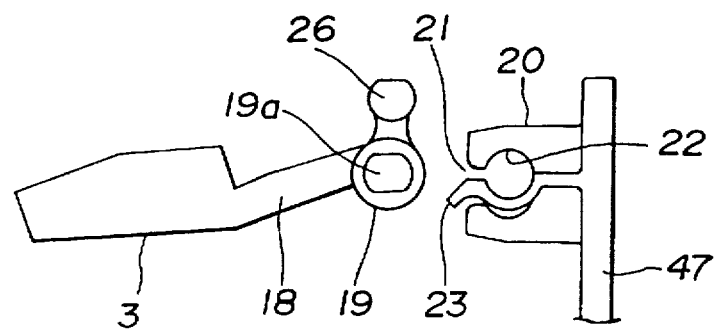
FIGS. 11A and 11B are views similar to FIG. 8B, showing the other assembling example of the lock plate.
Figure 11B:
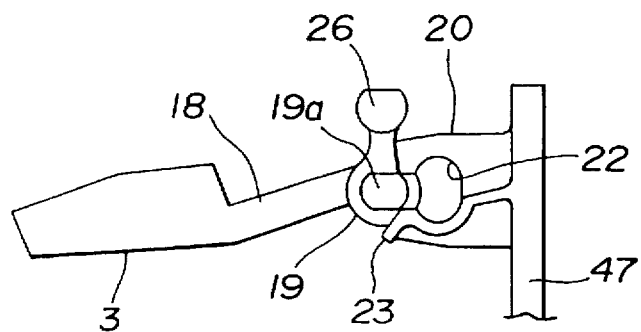

Referring to FIG. 5, the bearing 19a, 19b of the shank 19 is positioned in an upper part of the hole 22. Specifically, the shank 19 is formed with a recess 19c in the vicinity of the bearing 19a, 19b. A hooked portion of a coil bearing or resilient member 24 is engaged with the recess 19c, whereas a coil portion thereof is arranged to a pin 25 protruding below the support 20 of the bracket 47, biasing the shank 19 upwardly. Alternately, referring to FIGS. 11A and 11B, a holding arm or resilient member 23 may be integrated with a side face of the support 20 of the bracket 47 so as to contact the shank 19 in the vicinity of the bearing 19a, 19b, biasing the shank 19 upwardly by resiliency of the holding arm 23.

Thus, the shank 19 is biased to always move upwardly in the upper part of the hole 22 by the resilient member 24, 23 so that, as best seen in FIG. 3, the lock plate 3 is engaged with the detent recess 2 with a slight clearance between the bottom 16 of the lock plate 3 and the inner bottom 15 of the detent recess 2. In this embodiment, the bracket 47 is a member different from the position plate 1. Alternately, the bracket 47 may be integrated with the position plate 1 to which the support 20, for example, are arranged directly. Thus, the lock plate 3 is rotatably resiliently supported with respect to the position plate 1.

Figure 7A:
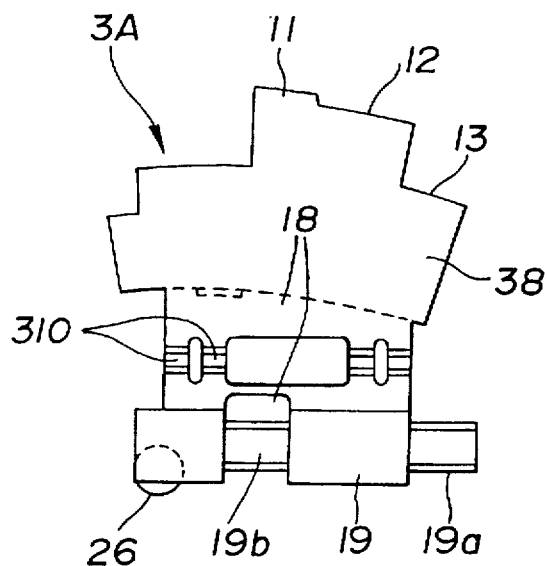
FIG. 7A is a front view showing another example of the lock plate.
Figure 7B:
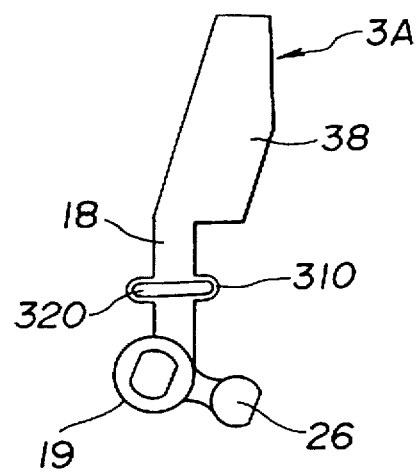
FIG. 7B is a view similar to FIG. 4B, showing another example of the lock plate.

In this embodiment; the shank 19 of the lock plate 3 is positioned in the upper part of the hole 22. Alternately, referring to FIGS. 7A–8B, if the lock plate 3 is constructed to contract the structure of the bearings 19a, 19b can be simplified. Specifically, referring to FIG. 7A, a lock plate 3A is constructed to have the arm 18 divided into two or upper and lower parts substantially at the center thereof, which are connected at both sides thereof by a substantially U-shaped thin flexible portion 310. Referring to FIG. 7B, the flexible portion 310 is integrated with the arm 18 to form a substantially oval hole 320 as viewed from the side thereof. Deformation of the flexible portion 310 permits vertical contraction of the lock plate 3A.

Figure 8A:
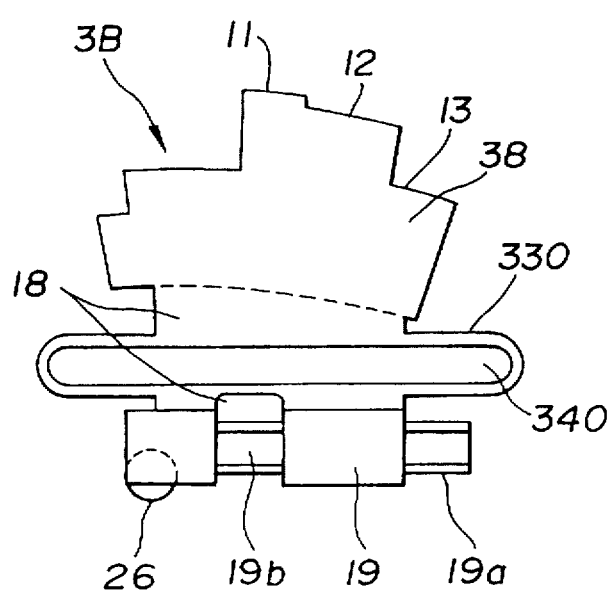
FIG. 8A is a view similar to FIG. 7A, showing the other example of the lock plate.
Figure 8B:
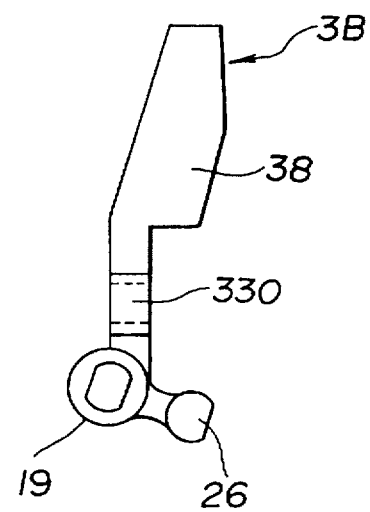
FIG. 8B is a view similar to FIG. 7B, showing the other example of the lock plate.
Figure 9:
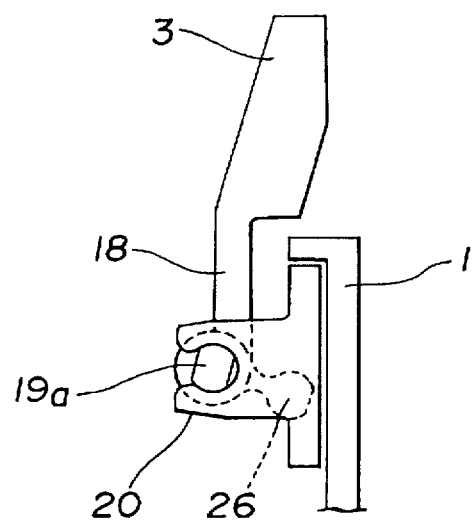
FIG. 9 is a view similar to FIG. 8B, showing another assembling example of the lock plate.

On the other hand, referring to FIGS. 8A and 8B, a lock plate 3B is constructed to have the arm 18 divided into two or upper and lower parts substantially at the center thereof, which are connected by a substantially U-shaped flexible portion 330 that protrudes from both sides of the arm 18. Referring to FIG. 8A, the flexible portion 330 is integrated with the arm 18 to form a substantially oval through hole 340 as viewed from the front thereof. The lock plate 3A, 3B has a height that can be reduced by bending of the flexible portion 310, 330 when the engaged portion 38 is depressed by the position pin 17, so that, referring to FIG. 9, the bearing 19a, 19b only needs to be rotatably arranged through a hole 22a having a circular section, resulting in no need of arranging the resilient member.

Figure 6:
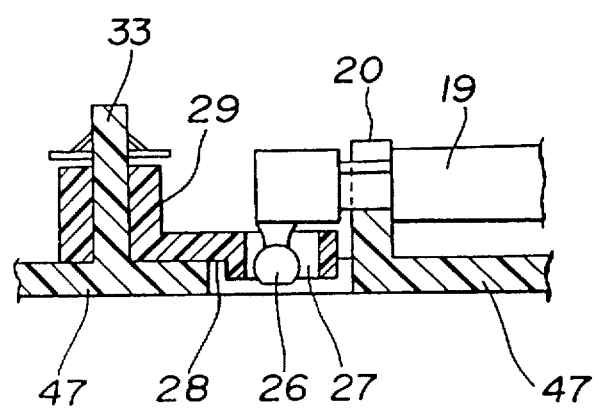
FIG. 6 is a plan view, partly in section, showing the lock plate as assembled.

As best seen in FIG. 3, in order to rotate the lock plate 3 to be engaged with or disengaged from the detent recess 2, a ball protrusion 26, which constitutes a ball joint, is crossingly integrated with the shank 19. Referring to FIGS. 2 and 6, a lever portion 28 having a hole 27 with which the ball protrusion 26 is engaged is integrated with the lock cam 29 of park lock. The lock cam 29 includes a lever portion 32 connected to a plunger 31 of the actuator 30 such as a solenoid, and is supported to a shaft 33, which protrudes from the bracket 47 to be rotatable parallel to the position plate 1.

Next, the operation of this embodiment will be described. When the shift lever 42 is positioned in the P range 4, the actuator 30 draws the plunger 31 by force of the spring arranged therein so that the lock cam 29 comes below the position pin 17. With the brake pedal depressed, the switch is turned on so that the actuator 30 is connected to a power source to press out the plunger 31. When the plunger 31 is extended out, the lock cam 29 is rotated counterclockwise about the shaft 33, and is moved in the direction out of the position below the position pin 17.

Thus, the position pin 17 restrained in the P range 4 can be moved to the other range. With rotation of the lock cam 29, the ball protrusion 26 is rotated through the lever portion 28, which produces rotation of the shank 19 so that the engaged portion 38 of the lock plate 3 integrated with the arm 18 is moved outwardly to get out of the detent recess 2.

When the position pin 17 is moved to the N range 6, the actuator 30 is turned off through vehicle speed detecting means and the switch 49 to draw the plunger 31 by force of the spring arranged therein. With this, the lock cam 29 is rotated about the shaft 33, whereas the lock plate 3 is rotated to get in the detent recess 2. The position pin 17 is restrained by the step 10 of the lock plate 3 and the inner periphery of the detent recess 2, so that even if the driver tries to depress the position pin 17, the position pin 17 is stopped by contacting the horizontal portion of the step 10, while even if he tries to longitudinally move the shift lever 42, it is stopped by contacting the vertical portion of the step 10.

With the brake pedal depressed for start of the motor vehicle, a brake switch is turned on to operate the actuator 30, extending out the plunger 31. This causes an opposite operation to the above such that the lock cam 29 is rotated out of the P range 4, and the lock plate 3 is moved out of the detent recess 2. Thus, the position pin 17 can be depressed to move the shift lever 42 longitudinally, e.g., from the N range 6 to the D range 7.

When depressed without depressing the brake pedal with shift lock made in the N range 6 in the way as described above, the position pin 17 contacts the step 10 to produce a force that functions as a force for depressing the lock plate 3. Thus, the shank 19 biased in the upper part of the hole 22 is moved downwardly therein against a force of the resilient member 24, 23, so that the bottom 16 of the lock plate 3 contacts the inner bottom 15 of the detent recess 2 to receive the above force, preventing movement of the position pin 17.

On the other hand, when the driver tries to move the shift lever 42 to the D range 7, the position pin 17 contacts the vertical portion of the step 10 of the lock plate 3, which is moved in its entirety, so that the vertical portion 3a of the engaged portion 38 contacts the inner side 14 of the detent recess 2, or a vertical portion 3b of the step 12 contacts an inner side 2a of the S range 8, preventing movement of the position pin 17. Therefore, it is important to form the engaged portion 38 of the lock plate 3 as a rigid structure.

It the shift lever device is constructed so that, in the state where the engaged portion 38 of the lock plate 3 comes in the detent recess 2, the bottom 16 of the engaged portion 38 contacts the inner bottom 15 of the detent recess 2, whereas the vertical portion 3a of the engaged portion 38 contacts the inner side 14 of the detent recess 2, there is no need to arrange the flexible means to the lock plate 3, or between the lock plate 3 and the support 20.

In this embodiment, however, the position plate 1, lock plate 3, lock cam 29, bracket 47, etc., are resin moldings, which have a great dispersion due to its difficulty in accuracy control of size, etc., as compared with metallic materials, so that, in the state that the engaged portion 38 of the lock plate 3 comes in the detent recess 2, means for absorbing the dispersion are arranged in the form of the clearance disposed between the outer periphery of the engaged portion 38 and the inner periphery of the detent recess 2, and the flexible means disposed between the lock plate 3 and the support 20, or to the lock plate 3.

Having described the present invention in connection with the preferred embodiment, it is noted that the present invention is not limited thereto, and various changes and modifications can be made without departing from the spirit of the present invention.

What is claimed is:

1. A shift lever device for an automatic transmission, comprising:

a position plate formed with a detent recess;

a position pin engagable with said detent recess;

a pair of supports arranged below said detent recess;

a lock plate rotatably supported by said pair of supports, said lock plate being formed with a first step that cooperates with said detent recess to prevent vertical and longitudinal movements of said position pin at at least in a neutral range, said lock plate being rotatable to engage said detent recess when said position pin is moved to said neutral range;

a lock cam rotatable to a position below said position pin when said position pin is moved to a parking range, said lock plate being rotatable together with said lock cam to engage said detent recess when said position pin is moved to said parking range; and a flexible means comprising a flexible portion arranged between two divided portions of said lock plate.

2. A shift lever device as claimed in claim 1, wherein said detent recess has a larger opening dimension than said lock plate to provide a clearance with respect to an inner periphery of said detent recess, said lock plate having a bottom that contacts an inner bottom of said detent recess when said position pin is depressed to contact said first step of said lock plate, said lock plate having a vertical portion and a second step that contact an inner side of said detent recess when said position pin is moved to contact said first step.

3. A shift lever device for an automatic transmission, comprising:

a position plate formed with a detent recess;

a position pin engagable with the detent recess;

a pair of supports arranged below the detent recess;

a lock plate rotatably supported by the pair of supports, the lock plate having a first step that cooperates with the detent recess to prevent vertical and longitudinal movements of the position pin at at least in a neutral range, the lock plate being rotatable to engage the detent recess when the position pin is moved to the neutral range, wherein the lock plate has two divided parts; and a flexible member including a flexible portion arranged between the two divided parts of the lock plate to ensure a flexible movement of the lock plate relative to the position plate.

4. A shift lever device as claimed in claim 3, wherein the detent recess has a larger opening dimension than the lock plate to provide a clearance with respect to an inner periphery of the detent recess, the lock plate having a bottom that contacts an inner bottom of the detent recess when the position pin is depressed to contact the first step of the lock plate, the lock plate having a vertical portion and a second step that contact an inner side of the detent recess when the position pin is moved to contact the first step.

5. A shift lever device as claimed in claim 4, further comprising a lock cam rotatable to position below said position pin when said position pin is moved to a parking range, said lock plate being rotated together with said lock cam to engage said detent recess when said position pin is moved to said parking range.

6. A shift lever device for an automatic transmission, comprising:

a position plate formed with a detent recess;

a position pin engagable with the detent recess;

a pair of supports connected to the position plate below the detent recess;

a lock plate rotatably supported by the pair of supports, the lock plate having a first step that cooperates with the detent recess to prevent vertical and longitudinal movements of the position pin at at least in a neutral range, the lock plate being rotatable to engage the detent recess when the position pin is moved to the neutral range, wherein the lock plate has two divided parts; and means for resiliently supporting the lock plate relative to the position plate to ensure a flexible movement of the lock plate relative to the position plate, wherein the detent recess has a larger opening dimension than the lock plate to provide a clearance with respect to an inner periphery of the detent recess, the lock plate having a bottom that contacts an inner bottom of the detent recess when the position pin is depressed to contact the first step of the lock plate, the lock plate having a vertical portion and a second step that contact an inner side of the detent recess when the position pin is moved to contact the first step.

7. A shift lever device as claimed in claim 6, further comprising a lock cam rotatable to position below the position pin when the position pin is moved to a parking range, the lock plate being rotated together with the lock cam to engage the detent recess when the position pin is moved to the parking range.

8. A shift lever device as claimed in claim 6, wherein said resilient means comprises a flexible portion arranged between said two divided parts of said lock plate.

9. A shift lever device as claimed in claim 6, wherein said resilient means are arranged between said lock plate and said pair of supports.

10. A shift lever device as claimed in claim 9, wherein said resilient means includes bearings of a shank integrated with said lock plate and a coil spring engaged with said shank.

11. A shift lever device as claimed in claim 10, wherein said resilient means includes holding arms integrated with said pair of supports.

\* \* \* \* \*